April 8, 1969  J. GAVRILA  3,436,971
TRANSFORMING MECHANISM TO CONVERT CONTINUOUS
ROTARY MOTION INTO RECIPROCAL MOTION, IN
A ROTARY DIRECTION
Filed July 8, 1966

INVENTOR
JUAN GAVRILA
By Steinberg + Blake
Attys

United States Patent Office 3,436,971
Patented Apr. 8, 1969

3,436,971
TRANSFORMING MECHANISM TO CONVERT CONTINUOUS ROTARY MOTION INTO RECIPROCAL MOTION, IN A ROTARY DIRECTION
Juan Gavrila, Capdevila St. No. 68, Villa Ballester, Buenos Aires, Argentina
Filed July 8, 1966, Ser. No. 563,769
Int. Cl. F16h 21/22
U.S. Cl. 74—44                        5 Claims

ABSTRACT OF THE DISCLOSURE

A drive for converting continuous rotary motion into reciprocal motion. A rotary crankshaft and a rotary cylinder respectively have parallel axes of rotation situated at a given distance from each other. The axis of rotation of the cylinder is normal to the cylinder axis. The crankshaft carries a crank arm whose length is equal to the distance between the parallel axes of rotation of the cylinder and crankshaft. The end of the crank arm which is distant from the crankshaft is pivotally connected with a piston which slides in the cylinder along the axis of the latter. Thus, during rotation of the crankshaft, the piston and cylinder will rotate also, rotary motion being transmitted to the cylinder through the piston from the crankshaft. Simultaneously with the continuous rotary movement of these components, the piston is reciprocated along the axis of the cylinder.

---

The invention deals with a new transforming mechanism, of mechanical motion, which allows for an appreciable reduction as concerns the dimensions, weight and machining time of the component pieces, therefore resulting in a lower cost.

This device is intended for full employment for such machines as air compressors, refrigerator compressors, hydraulic pumps, and so forth. This new mechanism seeks the replacement of the connecting rod-crank system, presently used in this type of machines.

It is constituted by three moving parts: A camshaft, a piston and a pump-casing or cylinder. The three pieces have a continuous rotary motion, but, due to the location of these pieces within the whole mechanism, and due also to the geometrical relation existing among one another, a second motion results which is a reciprocal motion of the piston inside of and related to the cylinder.

Figure 1:
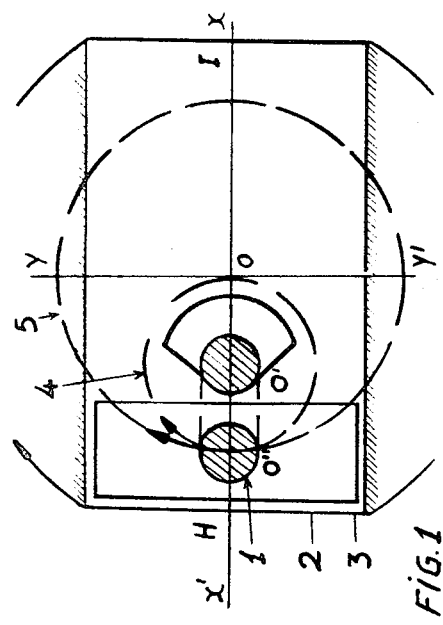

The material employed for this construction is the most common one, namely, (gray) cast iron, and its mechanization does not require any special machines, there not being any parts of complicate shapes. The intersection point O of the coordinates XX' and YY' is the center of the whole, which is constituted by the following pieces, as shown in FIGURE 1: A crankshaft or camshaft 1 is rotated around its center O', which may be located for instance on the abscissa XX' at a distance from center O equal to its crank arm length or eccentricity O'O'', by a rotative force from any given source of driving power. The course described by the crankpin or cam O'' will be the circle 4 which, due to the ratio OO'=O'O'', will turn through the center O of the whole mechanism. A piston 2, which is pivotally connected to the crankpin O'' of the crankshaft 1, will be forced to follow this same circle 4 around center O'.

Figure 2:
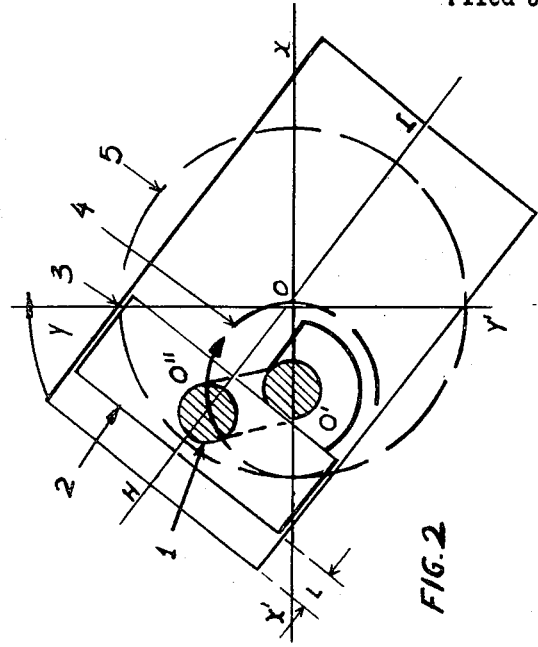

In FIG. 1, which considers the initial phase of the description, the abscissa XX' is superposed over the generatrix line HI of the third piece, namely: A pump-casing or cylinder 3 which is also rotary around its geometrical center whose location coincides with the center O of the whole. The rotation of the cylinder will be produced in the following manner: The crankshaft 1, under the influence of the rotary force received, will transmit this force normally by means of the piston 2 to the side wall of the cylinder 3, thus provoking it to rotate in the same plane around its rotation center O, as seen in FIG. 2. Let us consider, as a reference, a hypothetical circle 5 as described by a point of the pump-casing coincidental with O'' and placed on the HI or XX' generatrix line of the cylinder (see FIG. 1).

We have hitherto considered a total of three moving pieces with their three respective rotary motions, as well as their two rotation centers, namely O and O'. As both rotary motions occur, namely, that of the piston 2 following circle 4 and that of the cylinder following circle 5 (see FIG. 2), a rectilinear displacement of the piston takes place (as indicated by point O'') along the rotary generatrix line HI of the cylinder 3 and within this cylinder, towards the rotation center O of the cylinder, thus beginning the stroke L (FIG. 2) of the piston 2 inside the cylinder 3 in the direction of the arrows. The piston thus makes room at the H bottom of the cylinder for an increasing volume starting from zero which is considered as the suction (or intake) of any given fluid. The intake and discharge passages of the fluid do not appear in any of the enclosed figures.

As a logical consequence, a *discharge* of the fluid (which had been drawn in during the previous stroke) takes place between the other side of the piston and the other end I of the cylinder.

The resultant angular velocity of the cylinder 3 will be half the angular velocity of the crankshaft 1. This ratio is determined in the circle 4 of FIG. 2 and in any point of its circumference as follows:

angle $O''O'X'$ = 2 angles $O''OX'$ where $O''O'$ is the crank arm or eccentricity and $O''O$ is a staright line which, having both its ends prolonged, constitutes the generatrix line HI of the cylinder.

Figure 3:
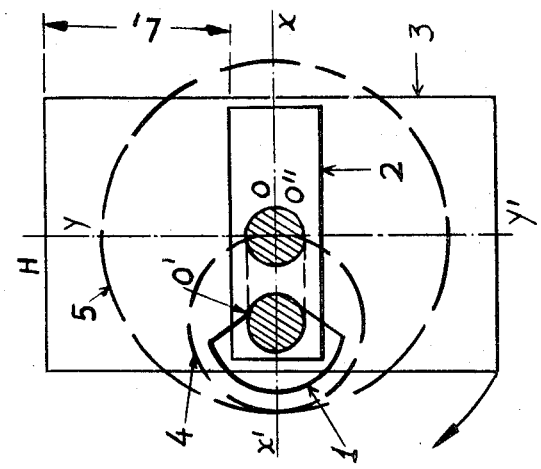

Thus, as shown in FIG. 3, when the crankshaft has rotated 180°, the cylinder or pump-casing will have rotated 90°, and then, the generatrix line HI of the cylinder will be superposed to the ordinate YY', and the crankpin O'' articulated to the piston 2 will be in the geometrical center O of both the cylinder and the whole, the piston having thus accomplished half an upward run L1.

During the remaining 180° of rotation of the crankshaft, the crankpin O'' articulated to the piston 2 and following the same circle 4, approaches the hypothetical circle 5 until it finally reaches the initial starting point O'' of FIG. 1, thus completing the first upward stroke of the piston.

The cylinder will now have rotated 180°; therefore, its initial position HI will now have become IH. This position marks the end of a suction (intake) between the piston and the H end of the cylinder, as well as a discharge between the piston and the I end of the cylinder.

In order to complete the cycle, so that a new volume of fluid may be sucked in during the remaining 180° of rotation of the cylinder, the crankshaft will have to rotate another 360°. From what has been hitherto described, the conclusion may be inferred that in order to accomplish a full cycle of intake and discharge of a same volume, in other words, a forward and return stroke of the piston 2, we shall see that, while the cylinder 3 will have to rotate one complete turn (namely, 360°), the crankshaft 1 will have to perform two complete rotations (namely, 720°), the relation crankshaft-cylinder thus being expressed by a ratio of two to one, which is a characteristic of this mechanism.

Figure 4:
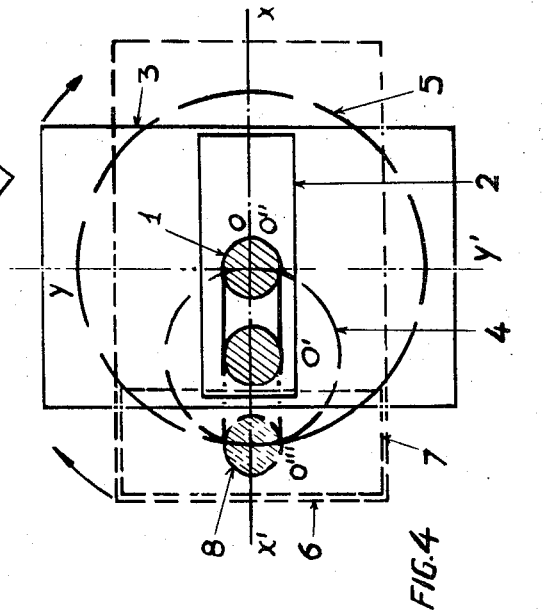

FIG. 4 represents the whole mechanism as constructed in practice. In order to standardize the resulting rotary forces working against the wall of the cylinder 3 in its revolving course of 180°, an addition was made of a second pump-casing 6 in tandem and with an angular displacement of 90° in the direction of the rotation, having its piston 7 connected to a second crankpin or cam 8 of the driving crankshaft 1, also in tandem and opposite the first crankpin O" (180°).

Having thus described the nature and scope of the present invention, as well as the manner in which this invention should be accomplished in practice, it is declared that what is hereby claimed as an invention and of exclusive property is:

1. In an apparatus for converting a continuous rotary drive into reciprocal motion, a rotary driving crankshaft and a rotary cylinder respectively having parallel axes of rotation situated at a given distance from each other, said cylinder having a cylinder axis normal to its axis of rotation, a crank arm fixed to and extending from said crankshaft and terminating distant therefrom in a crankpin having a crankpin axis parallel to said axes of rotation and spaced at said given distance from said axis of rotation of said crankshaft, and a piston slidable in said cylinder along said cylinder axis and pivotally connected to said crankpin so that upon rotation of said crankshaft said piston will rotate and transmit rotation to said cylinder while said piston reciprocates along said cylinder axis, said cylinder being driven in rotation exclusively by transmission of rotation thereto from said crankshaft, through said crank arm, crank pin, and piston.

2. The combination of claim 1 and wherein said crankpin axis is also normal to said cylinder axis.

3. The combination of claim 1 and wherein said cylinder has a pair of opposed ends, said axis of rotation of said cylinder being situated midway between said opposed ends thereof and said piston being situated in the region of one end of said cylinder when said crankpin axis and said axes of rotation of said crankshaft and cylinder are all located in a common plane with said axis of rotation of said crankshaft situated between said crankpin axis and axis of rotation of said cylinder.

4. The combination of claim 1 and wherein a plurality of crank arms are respectively fixed to and extend from said crankshaft at different angles with respect to each other, respectively, said crank arms respectively terminating in crankpins respectively having crankpin axes all situated at said given distance from said axis of rotation of said crankshaft, a plurality of said cylinders having said cylinder axis of rotation in common, and a plurality of said pistons respectively pivotally connected to said crankpins and respectively slidable in said cylinders along the cylinder axes thereof, whereby said cylinders and pistons are slidable therein will balance each other during rotary movement thereof in response to rotation of said crankshaft.

5. The combination of claim 4 and wherein there are two cylinders, pistons, and crank arms respectively terminating in said crankpins with said crank arms angularly displaced by 180° with respect to each other about said crankshaft.

References Cited

UNITED STATES PATENTS

| | | | |
|---|---|---|---|
| 263,258 | 8/1882 | Bechtolsheim | 123—44 |
| 860,899 | 7/1907 | Bucherer | 123—44 |
| 2,683,422 | 7/1954 | Richards | 123—44 |
| 331,847 | 12/1885 | Thomson | 74—44 |

FRED C. MATTERN, Jr., *Primary Examiner.*

W. S. RATLIFF, Jr., *Assistant Examiner.*